United States Patent
Kottapalli et al.

(10) Patent No.: US 7,149,881 B2
(45) Date of Patent: *Dec. 12, 2006

(54) METHOD AND APPARATUS FOR IMPROVING DISPERSAL PERFORMANCE IN A PROCESSOR THROUGH THE USE OF NO-OP PORTS

(75) Inventors: Sailesh Kottapalli, Milpitas, CA (US);
Udo Walterscheidt, San Jose, CA (US);
Andrew Sun, Santa Clara, CA (US);
Thomas Yeh, Cupertino, CA (US);
Kinkee Sit, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 399 days.

This patent is subject to a terminal disclaimer.

(21) Appl. No.: 10/804,865

(22) Filed: Mar. 19, 2004

(65) Prior Publication Data
US 2004/0187132 A1    Sep. 23, 2004

(51) Int. Cl.
*G06F 9/38*     (2006.01)

(52) U.S. Cl. .................................................... 712/215
(58) Field of Classification Search ................. 712/215
See application file for complete search history.

(56) References Cited

U.S. PATENT DOCUMENTS

| | | | |
|---|---|---|---|
| 6,195,756 B1 | 2/2001 | Hurd | 713/340 |
| 6,442,701 B1 | 8/2002 | Hurd | 713/324 |
| 6,564,316 B1 | 5/2003 | Perets et al. | 712/219 |

*Primary Examiner*—William M. Treat
(74) *Attorney, Agent, or Firm*—Kenyon & Kenyon LLP

(57) ABSTRACT

A method and apparatus for improving dispersal performance of instruction threads is described. In one embodiment, the dispersal logic determines whether the instructions supplied to it include any NOP instructions. When a NOP instruction is detected, the dispersal logic places the NOP into a no-op port for execution. All other instructions are distributed to the proper execution pipes in a normal manner. Because the NOP instructions do not use the execution resources of other instructions, all instruction threads can be executed in one cycle.

17 Claims, 3 Drawing Sheets

METHOD AND APPARATUS FOR IMPROVING DISPERSAL PERFORMANCE IN A PROCESSOR THROUGH THE USE OF NO-OP PORTS

BACKGROUND OF THE INVENTION

The present invention pertains to a method and apparatus for improving processor performance. More particularly, the present invention pertains to improving processor performance through special handling of no-op instructions.

As is known in the art, a processor includes a variety of sub-modules, each adapted to carry out specific tasks. In one known processor, these sub-modules include the following: an instruction cache; an instruction fetch unit for fetching appropriate instructions from the instruction cache; an instruction (or decoupling) buffer that holds the fetched instructions; dispersal logic that schedules the dispersal of individual instructions into separate execution pipes; execution pipes that execute the individual instructions; and an exception and retirement logic that checks for illegal operations and retires the exception-free instructions in program order. The components used for fetching instructions are often referred to as the "front end" of the processor. The components used for the execution of instructions are often referred to as the "back end" of the processor.

Programming code to be executed by the processor can sometimes be broken down into smaller components referred to as "threads." A thread is a set of instructions whose execution achieves a given task.

In certain known architectures such as VLIW (Very Long Instruction Word) and EPIC (Explicitly Parallel Instruction Computing), instructions are packaged together into bundles. For example, in these architectures, several different templates may be used that include a plurality of instructions to be executed. Such instruction handling is provided in the IA 64 (Intel Architecture—64-bits) architecture processors manufactured by Intel Corporation, Santa Clara, Calif. Each individual instruction may be referred to as a "syllable." In these processors two such bundles may be provided at a time from the decoupling buffer to the dispersal logic. In multithreaded processors, two or more decoupling buffers may be provided, corresponding to the number of simultaneous threads the processor can handle. Each decoupling buffer provides two bundles at a time to the dispersal logic. The two bundles would consist of six syllables, or six instructions. Depending on the type of instruction performed, each syllable is broadly categorized into one of four execution unit types: Integer (I), Memory (M), Floating-point (F), and Branch (B). The syllables from a bundle are each assigned to different execution ports. The execution ports are designed to specifically handle one or more types of the four execution unit types previously mentioned. For example, a Memory port ("M port") can handle Memory operations ("M-ops") or Integer operations ("I-ops"). In common processor implementations, there are a fixed number of execution ports, consisting of, for example, 4 M ports, 2 I ports, 2 F ports, and 3 B ports.

The templates that are provided for the bundles include MFI, MII, MFB, MMI, etc. For example, the MFI template includes one Memory operation, one Floating-point operation, and one Integer operation.

As is known in the art, an instruction may be provided to the execution unit that results in no significant task performance for the processor system. For example, in the Intel® x86 processor systems, a NOP (No operation) instruction causes the execution to take no action for an "instruction cycle." An instruction cycle as used herein is a set number of processor clock cycles that are needed for the processor to execute an instruction. Because of the templates that are used, the compiler is forced to pad a bundle with a NOP instruction when no other instruction can be issued in parallel due to dependencies. Although these NOP instructions do not perform useful work, each NOP needs to be executed to maintain precise exception handling. For example, if the next integer operation is to take place after two memory operations, the MMI template may be used, but without an Integer operation. Instead, a NOP instruction is inserted in the MMI template for the Integer operation.

When a NOP instruction is one of the syllables in a bundle, the NOP is also assigned to an available execution port. NOPs are type specific (i.e. NOP.i, NOP.m, NOP.f, or NOP.b), so they must be executed on the specified port (I, M, F or B). The NOP uses an execution port, but does not utilize the task performance capabilities of the execution port. Thus, the NOP may take up execution resources that would otherwise be available for other useful operations, such as those from a different thread in an SMT implementation. As a result, in a simultaneous multi-threaded processor, all bundles may not be issued in one cycle because a NOP would have taken an execution port that a true operation would have utilized. NOPs can make up a significant percentage of programming code. Using current compilers, they can account for approximately 30% of the code density in service systems (e.g. transaction processing systems). This inherently limits the performance of a processor by having numerous NOPS, that may require little or no execution, occupying the limited execution resources.

In view of the above, there is a need for a method and apparatus for improving dispersal performance.

DETAILED DESCRIPTION OF THE DRAWINGS

Figure 1:
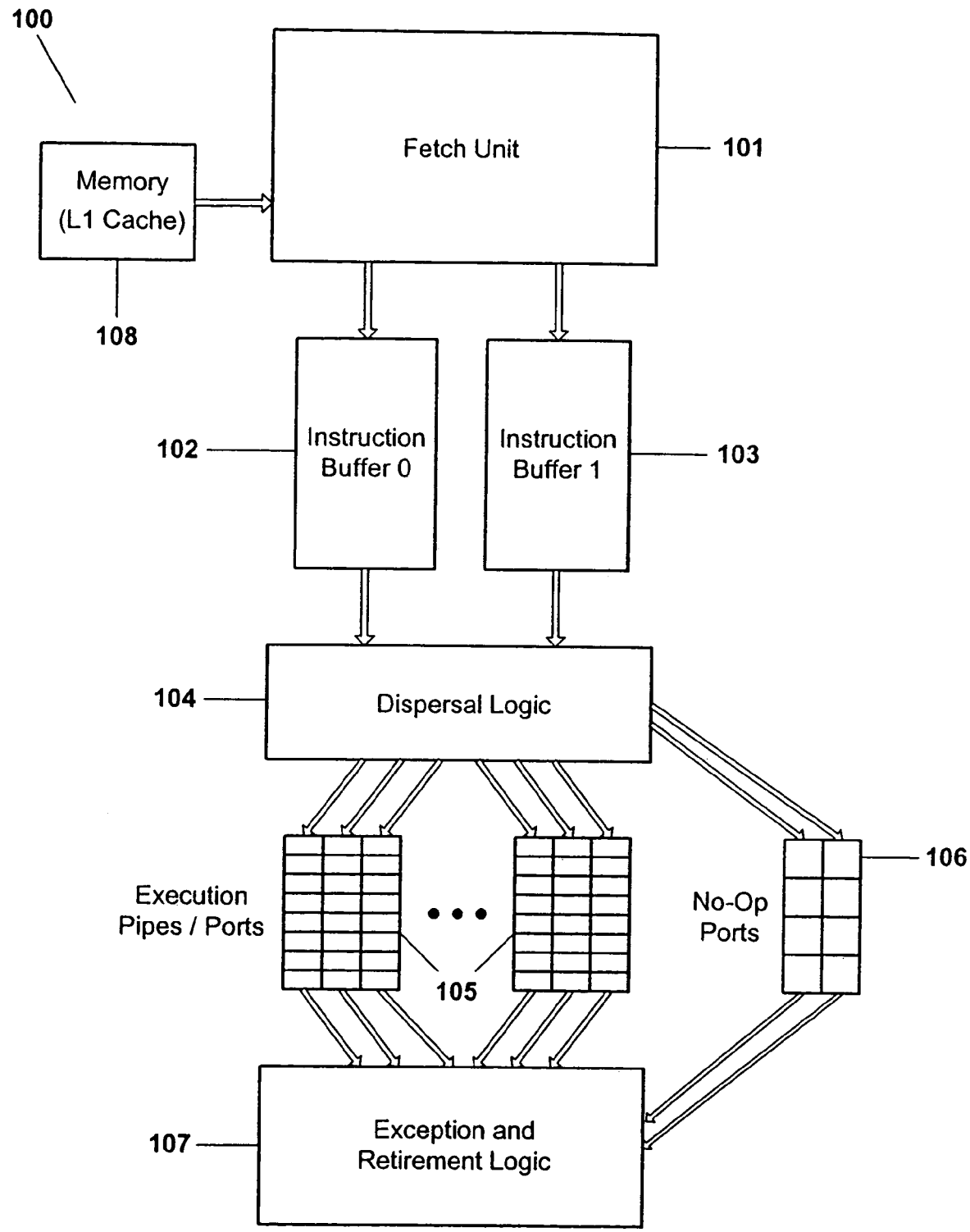
FIG. 1 is a block diagram of a portion of a multi-threaded processor employing an embodiment of the present invention.

Referring to FIG. 1, a block diagram of a processor system 100 (e.g. a microprocessor, a digital signal processor, or the like) operated according to an embodiment of the present invention is shown. In this embodiment, the processor is a multi-threaded processor where the execution is theoretically divided into two or more logical processors. As used herein, the term "thread" refers to an independent instruction code sequence. For example, in a video phone application, the processor may be called upon to execute code to handle video images as well as audio data. There may be separate code sequences whose execution is designed to handle each of these data types. Thus, a first thread may include instructions for video image data processing and a second thread may include instructions for audio data processing. In this example, there are one or more execution units (i.e., multiple execution pipes 105), which may execute one or more instructions at a time. The processor system 100, however may be treated as two logical processors, a first logical processor executing instructions from the first thread (thread 0) and a second logical processor executing instructions from the second thread (thread 1).

In this embodiment of the processor system 100, instructions are fetched by a fetch unit from memory (e.g., including L1 cache memory 109) and supplied to decoupling or instruction buffers, as thread 0 in instruction buffer 0 (i.e., instruction buffer 102) or thread 1 in instruction buffer 1 (i.e., instruction buffer 103). Also, more instruction buffers may be provided as needed or necessary. In this embodiment of the present invention, the instructions are supplied to the instruction buffers in template form (as described above). The instruction buffers supply its outputs to the dispersal logic 104. According to an embodiment of the present invention, No-Op ports 106 are provided for the execution of NOP instructions in the instruction buffers. The dispersal logic 104 controls whether instructions from thread 0 or thread 1 are then supplied either to the execution ports 105 or the no-op ports 106. Both the execution pipes 105 and the no-op ports 106 execute their respective instructions. The outputs of each are supplied to the exception and retirement unit 107.

According to this embodiment of the present invention, the dispersal logic is used to direct the instructions, NOP or otherwise, to the appropriate ports. In FIG. 1, the dispersal logic 104 identifies whether the instructions supplied to it in a bundle by the instruction buffers 102 and 103 are NOPs. Dispersal logic 104 places the NOP instructions into the no-op ports 106 and all other syllables within their respective execution type ports of execution pipes 105. Thus, because the NOP instructions do not take up the resources of the execution pipes 105, more instructions are being executed (other than NOPs) in the execution pipes 105.

Figure 2:
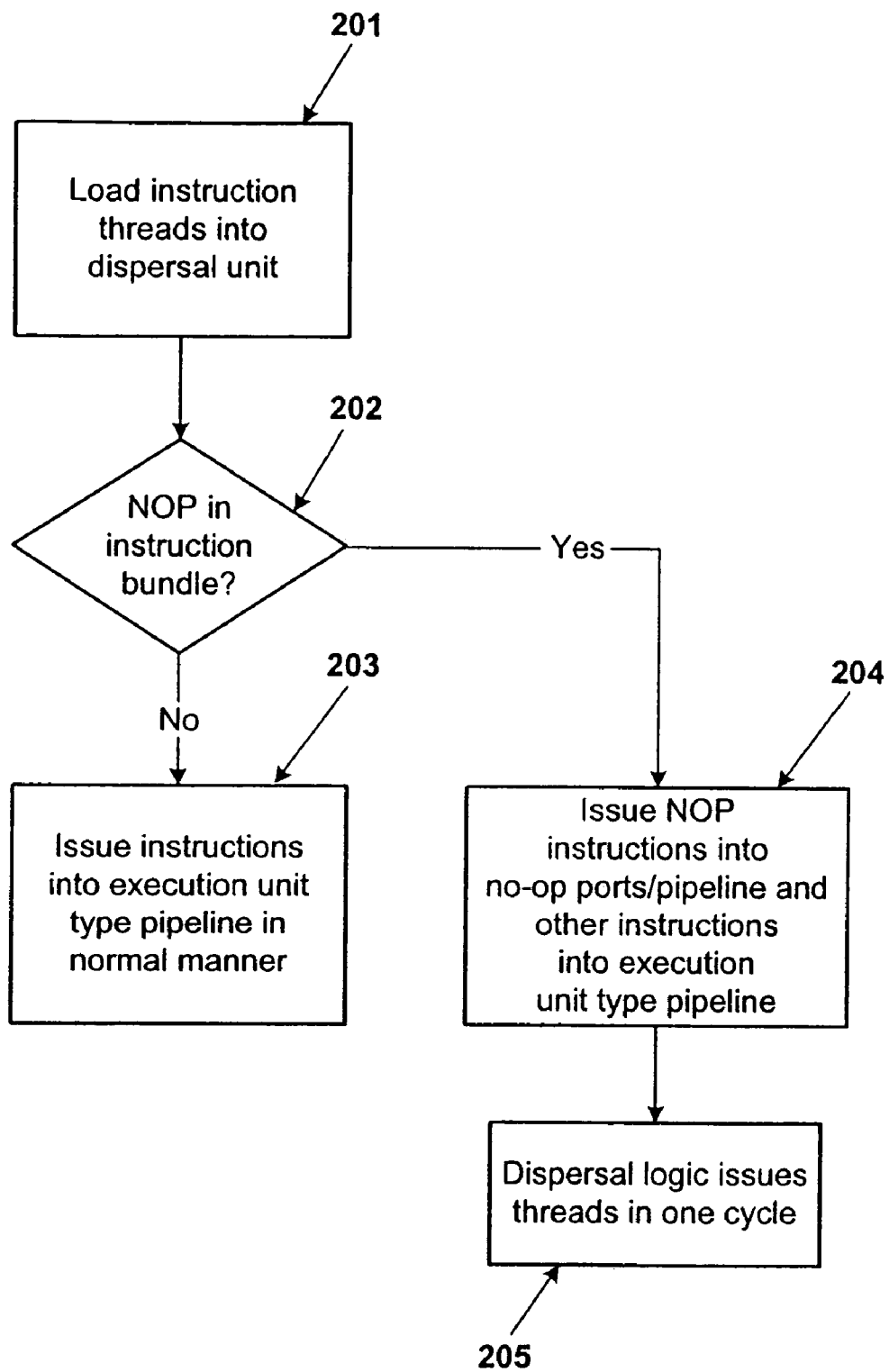
FIG. 2 is a flow diagram showing an embodiment of a method according to an embodiment of the present invention.

An example of the operation of the dispersal logic 104 in this embodiment is shown in FIG. 2. After receiving the output from the instruction buffers, in block 201, the instruction threads are loaded into dispersal logic 104. In decision block 202, it is determined whether there are any NOP instructions within the bundles. If there are, then control passes to block 204 where the NOP instructions are placed into the no-op ports and all other instructions are placed into their respective execution unit type pipelines. Control then passes to block 205 where the instruction threads can be issued in one cycle. If there are no NOP instructions, control proceeds to block 203 where instructions are placed into the execution pipes in a normal manner.

Figure 3:
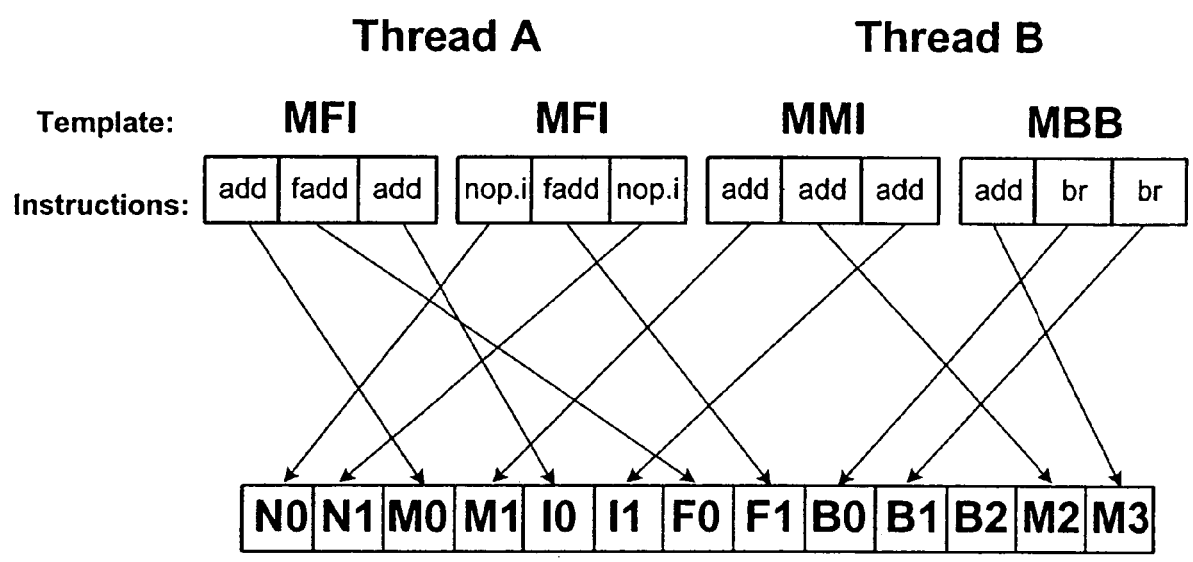
FIG. 3 is a schematic diagram showing the transfer of instructions from the dispersal logic to execution and no-op ports according to an embodiment of the present invention.

The transfer of instructions from the dispersal logic to the execution and no-op ports is shown schematically in FIG. 3. In FIG. 3, the execution ports include four memory execution units (M0–3), two integer execution units (I0–1), two floating-point execution units (f0–1), three branch execution units (B0–2) and two No-op execution units (N0–1). Two bundles for a first thread (Thread A) and two bundles for a second thread (Thread B) are shown. For Thread A, two MFI templates are provided and for Thread B, an MMI template and MBB template are provided. As seen by the arrows, the NOP instructions in Thread A are supplied to the No-op execution units for proper handling (e.g., execution). The remaining instructions from Thread A and Thread B are supplied by the dispersal logic to appropriate memory, integer, floating-point, and branch execution units for proper handling. Absent the No-op operation units, the nop.i instructions would be provided to integer execution units preventing all of the instructions in the four bundles from being issued to the execution ports in the same cycle.

As seen from the above, the no-op ports work to keep the instruction processing rate high. This is because the NOP instructions which use little or no execution resources are placed in their own ports rather than the normal execution pipeline, which effectively raises the number of instructions which can be executed during one clock cycle. When the dispersal logic places the NOP instructions into the no-op ports, instructions that require the resources of the execution pipeline can be placed in a now available execution port. Thus, with the ability to commit more instructions in fewer cycles, overall performance of the processing system may be increased The No-op ports may take up very little floor space in the processing system 100. In one embodiment, six No-Op ports 106 may be provided where each NO-OP port includes a number of flip-flops (e.g., 12) which simply pass information between the dispersal logic 104 and the exception and retirement logic 107 indicating that the NOP instruction has been "executed."Because the execution ports include several hundred times as many flip-flops as these NOP ports, the NO-op ports may take up a much smaller percentage of floor space compared to the execution ports. Thus, in the example shown in FIG. 3, simply adding additional execution ports to handle all twelve instructions in the same cycle greatly impacts the amount of floor space needed on the chip for the execution units of the processing system.

Although a single embodiment is specifically illustrated and described herein, it will be appreciated that modifications and variations of the present invention are covered by the above teachings and within the purview of the appended claims without departing from the spirit and intended scope of the invention.

What is claimed is:

1. A processing system comprising:
    dispersal logic to receive a plurality of instructions;
    an execution port coupled to said dispersal logic; and
    a No-op port coupled to said dispersal logic.

2. The system of claim 1 wherein said No-op port is to process NOP instructions of said plurality of instructions.

3. The system of claim 2 wherein said execution port is to process at least one of the following: memory instructions, integer instructions, floating-point instructions, and a branch instructions.

4. A processing system comprising:
    dispersal logic to receive a plurality of instructions;
    a plurality of execution ports coupled to dispersal logic; and
    a No-op port coupled to said dispersal logic, said No-op port to process NOP instructions of said plurality of instructions.

5. The system of claim 4, wherein said plurality of instructions are taken from at least two individual threads.

6. The system of claim 5 further comprising:
    first and second instruction buffers coupled to said dispersal logic to store said plurality of instructions for first and second threads, respectively.

7. The system of claim 4, wherein said execution ports are to process at least one of the following: memory instructions, integer instructions, floating-point instructions, and a branch instructions.

8. The system of claim 6, wherein said execution ports are to process at least one of the following: memory instructions, integer instructions, floating-point instructions, and a branch instructions.

9. The system of claim 7 wherein said plurality of instructions are grouped into bundles prior to processing in said No-op and execution ports.

10. The system of claim 8 wherein said plurality of instructions are grouped into bundles prior to processing in said No-op and execution ports.

11. A method of dispersing instructions in a multi-threaded processing system including a plurality of execution ports and at least one NO-op port, comprising:
determining if an instruction is a NOP instruction; and
dispersing said NOP instruction for execution by a No-op port.

12. The method of claim 11, wherein said plurality of instructions are taken from at least two individual threads.

13. The method of claim 12 further comprising:
supplying said plurality of instructions to said dispersal logic from first and second instruction buffers coupled to dispersal logic to store said plurality of instructions for first and second threads, respectively.

14. The method of claim 11, further comprising:
processing instructions in said execution ports wherein said execution ports are to process at least one of the following: memory instructions, integer instructions, floating-point instructions, and a branch instructions.

15. The method of claim 13, further comprising
processing instructions in said execution ports wherein said execution ports are to process at least one of the following: memory instructions, integer instructions, floating-point instructions, and a branch instructions.

16. The method of claim 14 further comprising:
grouping said plurality of instructions into bundles prior to said supplying said instructions to said dispersal logic.

17. The method of claim 15 further comprising:
grouping said plurality of instructions into bundles prior to said supplying said instructions to said dispersal logic.

* * * * *

UNITED STATES PATENT AND TRADEMARK OFFICE
CERTIFICATE OF CORRECTION

PATENT NO. : 7,149,881 B2
APPLICATION NO. : 10/804865
DATED : December 12, 2006
INVENTOR(S) : Sailesh Kottapalli et al.

It is certified that error appears in the above-identified patent and that said Letters Patent is hereby corrected as shown below:

Column 4, line 36: "No-op"
should be --non-execution--

Column 4, line 37: "No-op"
should be --non-execution--

Column 4, line 38: "process NOP instructions of said plurality of instructions"
should be --process instructions to take no action for an instruction cycle--

Column 4, line 47-48: "No-op port coupled to said dispersal logic, said No-op port to process NOP instructions of said plurality of instructions"
should be --a non-execution port coupled to said dispersal logic, said non-execution port to process instructions to take no action for an instruction cycle--

Column 4, line 61: "claim 6"
should be --claim 5--

Column 4, line 65: "claim 7"
should be --claim 6--

Column 4, line 67: "No-op"
should be --non-execution--

Column 5, line 1: "claim 8"
should be --claim 7--

Column 5, line 3: "No-op"
should be --non-execution--

Column 5, line 6: "No-op"
should be --non-execution--

UNITED STATES PATENT AND TRADEMARK OFFICE
CERTIFICATE OF CORRECTION

PATENT NO. : 7,149,881 B2
APPLICATION NO. : 10/804865
DATED : December 12, 2006
INVENTOR(S) : Sailesh Kottapalli et al.

It is certified that error appears in the above-identified patent and that said Letters Patent is hereby corrected as shown below:

Column 5, lines 7-9: "determining if an instruction is a NOP instruction; and
dispersing said NOP instruction for execution by a No-op port"
should be --determining if an instruction is an instruction to take no
action for an instruction cycle; and
dispersing said instruction to take no action for an instruction
cycle for execution by a non-execution port--

Signed and Sealed this

Twenty-fifth Day of March, 2008

JON W. DUDAS
*Director of the United States Patent and Trademark Office*